Figure 1:
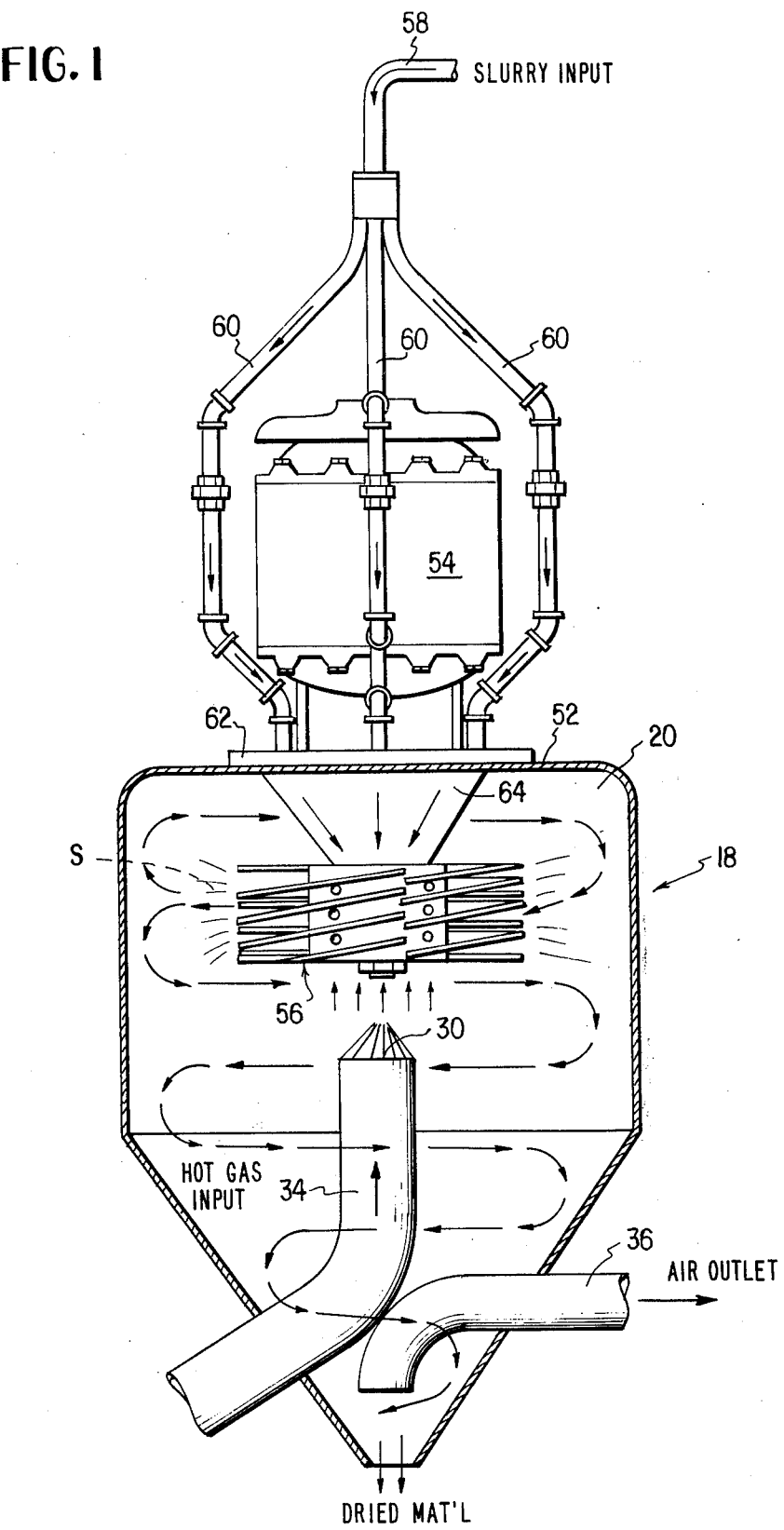

United States Patent [19]
Morris

[11] 4,013,504
[45] Mar. 22, 1977

[54] METHOD AND APPARATUS FOR SPRAY DRYING SLURRIES AND THE LIKE

[76] Inventor: Walter E. Morris, 752 Thurmond Drive, Macon, Ga. 31204

[22] Filed: Sept. 18, 1975

[21] Appl. No.: 614,643

[52] U.S. Cl. .................................. 159/4; 159/4 S; 239/223
[51] Int. Cl.² .......................................... B01D 1/16
[58] Field of Search ........................ 159/4 S, 11 D; 239/214.11, 214.15, 214.21, 223

[56] References Cited
UNITED STATES PATENTS

| | | | |
|---|---|---|---|
| 1,989,406 | 1/1935 | Doolittle | 159/4 S |
| 2,240,854 | 5/1941 | Peebles | 159/4 R |
| 2,287,795 | 6/1942 | Hall | 159/4 S |
| 2,559,989 | 7/1951 | Nyrop | 159/4 B |
| 2,575,119 | 11/1951 | Peebles et al. | 159/4 R |
| 2,634,808 | 4/1953 | Arnold | 159/4 B |
| 2,921,383 | 1/1960 | Morris | 159/4 S |

FOREIGN PATENTS OR APPLICATIONS

| | | | |
|---|---|---|---|
| 500,592 | 3/1954 | Canada | 159/4 B |
| 61,373 | 12/1941 | Denmark | 159/4 B |
| 1,335,550 | 7/1963 | France | 239/223 |
| 709,693 | 6/1954 | United Kingdom | 159/4 S |

*Primary Examiner*—Jack Sofer
*Attorney, Agent, or Firm*—Newton, Hopkins & Ormsby

[57] ABSTRACT

A spray drying apparatus includes a chamber through which cyclonic flow of heated gas is maintained. A rotating spray head is located in the chamber adjacent to the heated gas inlet and aligned axially of the cyclonic flow so as to receive the hottest gas. The spray head has spiral vanes which define heated gas flow channels extending spirally in the axial flow direction. The slurry is introduced into the bottoms of these channels to flow in thin film fashion across the vanes whereby the hottest gas scrubs the thin films before the liquid is discharged in finely divided form from the edges of the vanes.

7 Claims, 11 Drawing Figures

METHOD AND APPARATUS FOR SPRAY DRYING SLURRIES AND THE LIKE

BACKGROUND OF THE INVENTION

This invention relates to method and apparatus for spray drying liquids such as slurries and the like. The basic combination of a spray drying chamber through which a generally cyclonic flow of heated drying gas is maintained, and with there being a spray-producing rotatable head disposed in such chamber which discharges the liquid to be spray dried in finally divided form in directions essentially transverse to the cyclonic flow of heated gas are old and well known. Many efforts have been made to enhance the spray-producing action so as to assure extremely divided form of the liquid as it is discharged centrifugally from the rapidly rotating spray-producing head, thereby to maximize the surface-to-volume ratio of the droplets produced correspondingly to maximize the drying action within the chamber.

Whereas the prior art systems obtain satisfactory drying, they do not make optimum use of the hot air or gas to vaporize the moisture of the slurry by transferring the sensible heat during the period of dispersion and discharge of the liquid by the spray-producing head. Moreover, the prior art devices often are characterized by the fact that the finest particles of liquid become trapped in the more or less stagnant center of the hot gas flow. This leads to inefficiency because the smallest particles are of course most propense to rapid drying and therefore should not remain in the more or less stagnant center of the air flow but should be moved outwardly so as to achieve the most efficient and effective drying action.

BRIEF SUMMARY OF THE INVENTION

The present invention is directed to method and apparatus which inherently provides greater efficiency and effectiveness of the spray drying action.

Basically, the present invention involves the use of a spray-producing head which is disposed in the axial or central region of the cyclonic heated gas flow and closely adjacent to the inlet for the heated gas so as to be in an environment of maximum temperature within the drying chamber; and wherein the spray-producing head defines heated gas flow channels which extend spirally in such axial direction. The liquid or slurry to be dried is introduced into these channels adjacent the bottoms thereof so that the liquid due to the rotation of the head flows across the vanes and thereby is distributed as thin films thereon which are contacted and correspondingly scrubbed by contact with the heated gas flow. The film of slurry flowing over the vanes are subjected to high shear stresses which materially improve the viscosity of the product and thereby further aids in the scrubbing action and, as well, assures that when the product is discharged from the peripheral edges of the vanes, the particle will be broken up and finally dispersed in very efficient manner.

BRIEF DESCRIPTION OF THE DRAWING FIGURES

FIG. 1 is a view partially in vertical section illustrating one embodiment of the invention;

FIG. 2 is a view similar to FIG. 1 but showing another embodiment of the invention;

FIG. 3 is a vertical section taken through the spray head employed in the embodiment of FIG. 1;

FIG. 4 is a horizontal section taken through the head of FIG. 3;

FIG. 5 is a perspective view of the head shown in FIGS. 3 and 4;

FIG. 6 is a side elevational view of the head shown in FIGS. 3–5;

FIG. 7 is a bottom plan view of the head shown in FIG. 6;

FIG. 8 is a side elevational view of a spray or dispensing head used with the embodiment of FIG. 2;

FIG. 9 is a top plan view of the assembly of FIG. 8;

FIG. 10 is a side elevational view of a modified form of spray or dispensing head; and FIG. 11 is a schematic view of a complete system within which the present invention is employed.

DETAILED DESCRIPTION OF THE INVENTION

Reference is had to FIG. 11 to illustrate the environment of the present invention. In FIG. 11, a supply tank 10 contains a supply of slurry 12 or the like which is intended to be dried and is fed therefrom under the action of a suitable pump 14 to the spray dispensing head 16 of this invention, same being located within the housing 18 which defines the drying chamber 20 proper. The drying chamber is shaped to allow for a cyclonic movement of heated gas such as air to flow therewithin whereby the drying action takes place.

This air flow is created by means of a fan 22 having a suitably filtered inlet 24 and discharging to the air heater device 26. From the air heater the heated gas flows to the duct 28 into the interior of the chamber through the discharge member 30 which is of conventional construction. A cooling fan 32 may be provided to circulate air within the wall space 34 as is also conventional. The air outlet is through the duct 36 which leads into the bag filter device 38 and through the discharge ducting 40 and the eduction fan 42 ultimately to the exhaust stack 44.

The bottom of the housing 18 which defines the drying chamber 20 is provided with an outlet or discharge for the particulate solid material and, as is conventional, may be valved as at 46 to control the discharge flow of the particulate solids which are discharged onto a suitable collection device such as a conveyor belt 48. Similarly, the bottom of the bag filter 38 is provided with a valve outlet 50 which discharges onto the conveyor belt 48.

In the embodiment of the invention as is shown in FIG. 1, it will be seen that the top wall 52 of the housing 18 mounts a suitable motor 54 which is employed to rotate the dispensing head 56 at high rotational speed within the drying chamber 20. In order to clear around this motor 54, the slurry inlet 58 is provided with a number of branches 60 which lead through the mounting flange member 62 into the feed well device 64 as is illustrated in FIG. 3. The feed well 64 is affixed to the upper wall 52 of the housing 18 and has a lower discharge mouth 66 of generally cylindrical form which loosely fits within the open upper end of the head device 56 as is clearly shown in FIG. 3. The head 56 includes a hollow body portion 68 which defines the inlet chamber 70 with which the feed well 64 communicates and, as will be seen, the drive shaft 72 of the motor 54 projects centrally through the feed well 64 and is secured as by splines or other connections and the nut 74 to the body portion 68 of the dispensing of spring head 56. Thus, the head is rotated at high speeds under the action of the motor 54.

Figure 6:
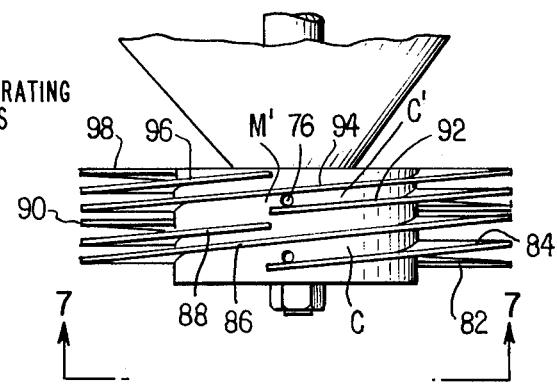
Figure 4:
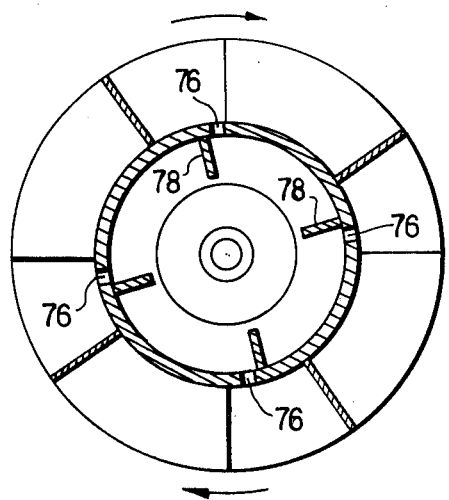
Figure 7:
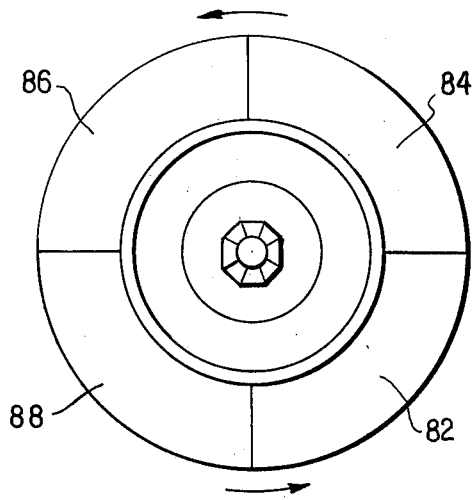
Figure 5:
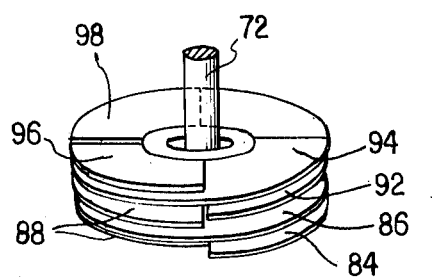

The body portion 68 is provided with a number of discharge orifices 76 and in order to accelerate the flow of liquid discharged through these orifices 76, the radially directed accelerator plates 78 may be provided on the inner surface of the body portion 68 as is shown more clearly in FIG. 4. On the exterior surface of the cylindrical side wall 80 of the body portion 68, a number of spiral vanes are provided as can be seen best in FIGS. 5–7. In the embodiment shown, there are nine spiral vanes each extending 180° around the circumference of the cylindrical wall 80, successive spiral vanes being staggered 90° with respect to each other. In the specific embodiment shown, there are nine such spiral vanes, 82, 84, 86, 88, 90, 92, 94, 96 and 98. These vanes are staggered circumferentially 90° in the direction of rotation of the dispensing head and are also staggered axially in this succession from the bottom to the top of the dispensing head in this particular embodiment. Successive vanes define channels therebetween for the flow of heated drying gas and at the mouth of each such channel, one of the discharge orifices 76 is located, each channel extending through 90° of arc. For example, in FIG. 6 the two vanes 84 and 86 define a channel C having a mouth M adjacent which one of the discharge orifices 76 is located. Similarly, vanes 92 and 94 also form a channel C' having a mouth M' adjacent which the discharge orifice 76 is located as shown. Thus the series of channels formed by the vanes serve to pump the hot drying gas axially to some extent. At the same time, the liquid which is being discharged through the orifices at the bottoms of the channels spreads over and across the surfaces of the vanes in thin film fashion. These films are subjected to high shear stresses due to the scrubbing action of the heated drying gas and thus initiate an efficient drying action immediately. These shear stresses as pointed out before also favorably affect the viscosity of the liquid and when the liquid is centrifugally impelled from the edges of the vanes, a very efficient spray formation is effected. Moreover, the broken up droplets which are flung from the peripheral edges of the blades are directed substantially transversely of the cyclonic flow of heating gas within the chamber 20 as indicated by the lines S in FIG. 1 and, as well, the heated gas is impelled in this direction also.

Figure 2:
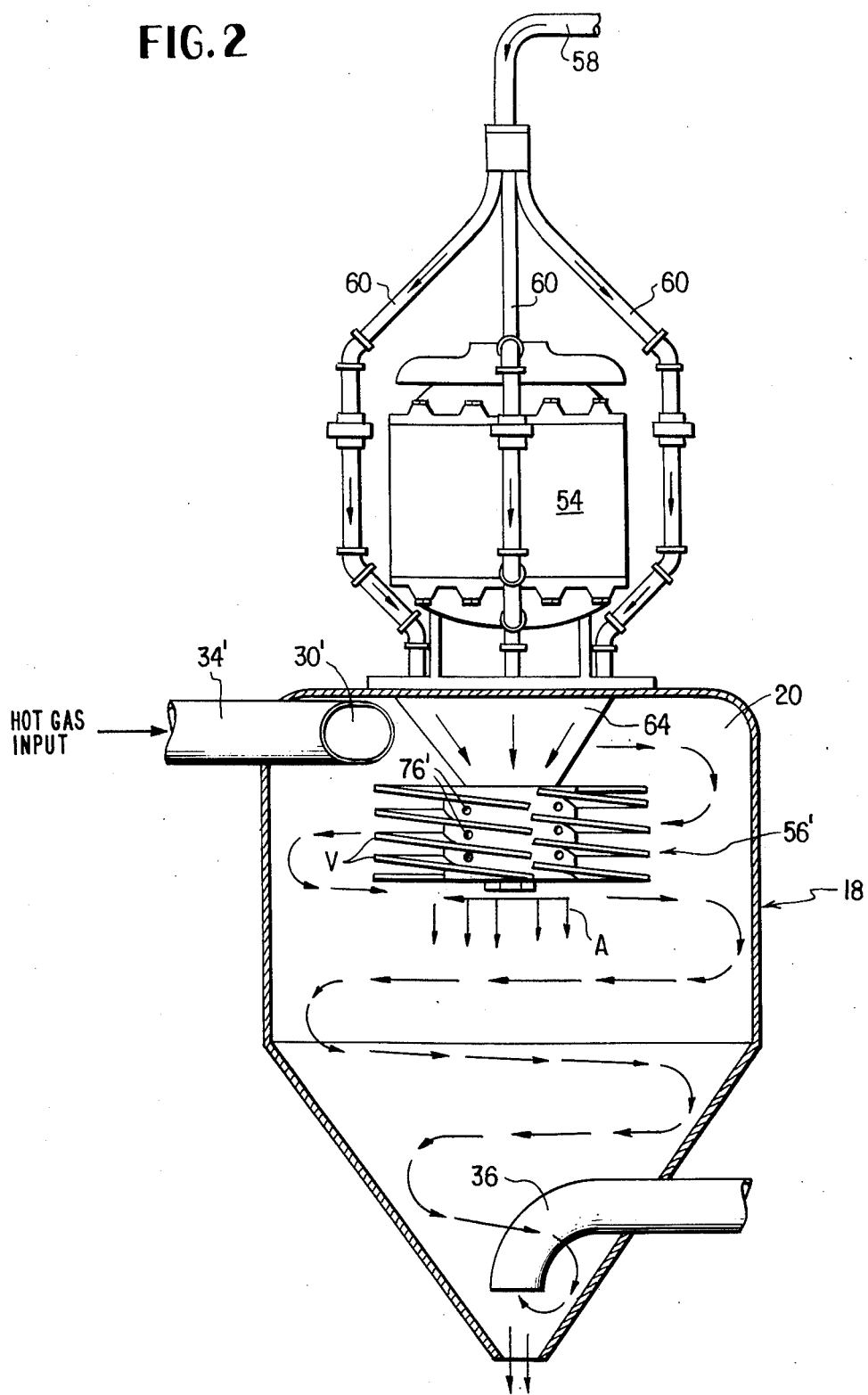
Figure 3:
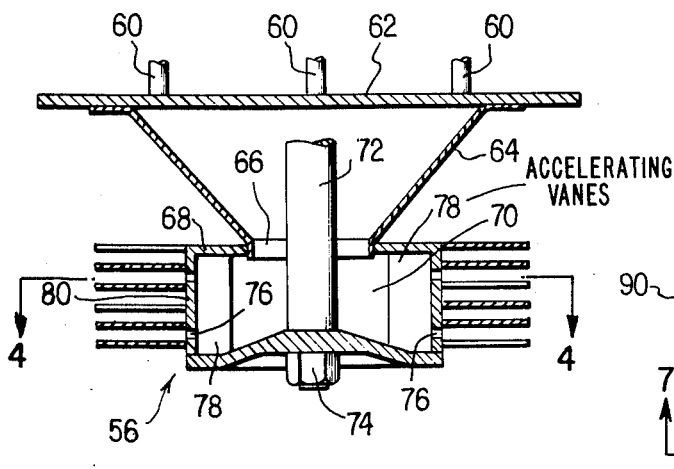
Figure 8:
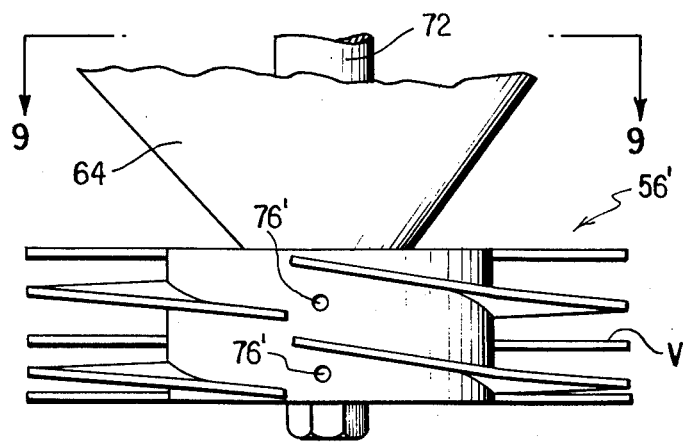

In the embodiment of FIG. 2, a slightly different form of spray head 56' is utilized in view of the modified heated gas flow pattern utilized. In FIG. 2, the heated gas inlet is through a duct 34' which discharges essentially tangentially into the chamber 20 through its discharge mouth 30', thus creating the cyclonic drying gas flow as before. However, in this case, the heated gas discharge is above the dispensing head 56' and the inclination of the vanes V are opposite to the inclination of the vanes in FIG. 1. In this case, since the air or heated gas inlet is above the dispensing head, the rotation of the head creates some flow of heated gas into the low pressure central region of the cyclonic flow as is indicated by the arrows A in FIG. 2. The vanes V and discharge orifices 76' are related as described hereinabove whereby the vanes form heated gas flow channels at the mouths of which the discharge orifices 76' are located so as to effect the scrubbing action of the thin film of liquid being centrifugally forced across the surfaces of the vanes. The arrangement is illustrated in FIG. 8.

Figure 9:
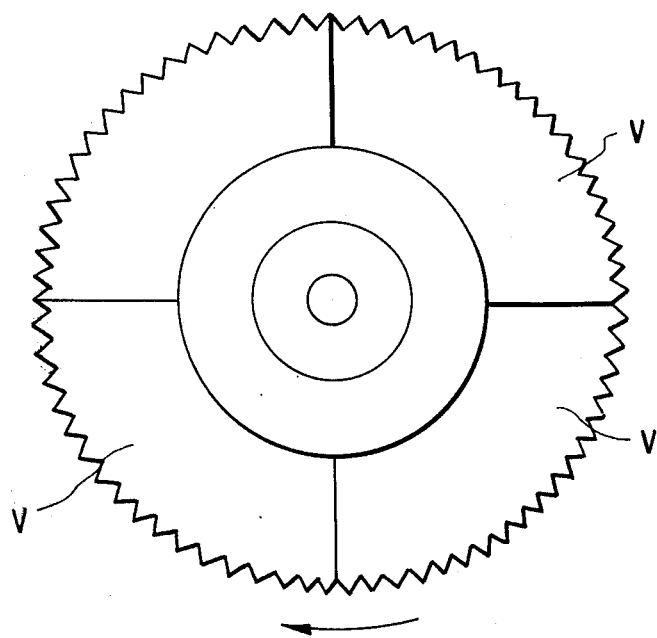

FIG. 9 illustrates a modification which may be effected to the various vanes in any embodiment of the invention. As shown, the edges of the vanes may be serrated so as more effectively to provide breaking up action of the droplets flung centrifugally from the peripheral edges of the plates.

Figure 10:
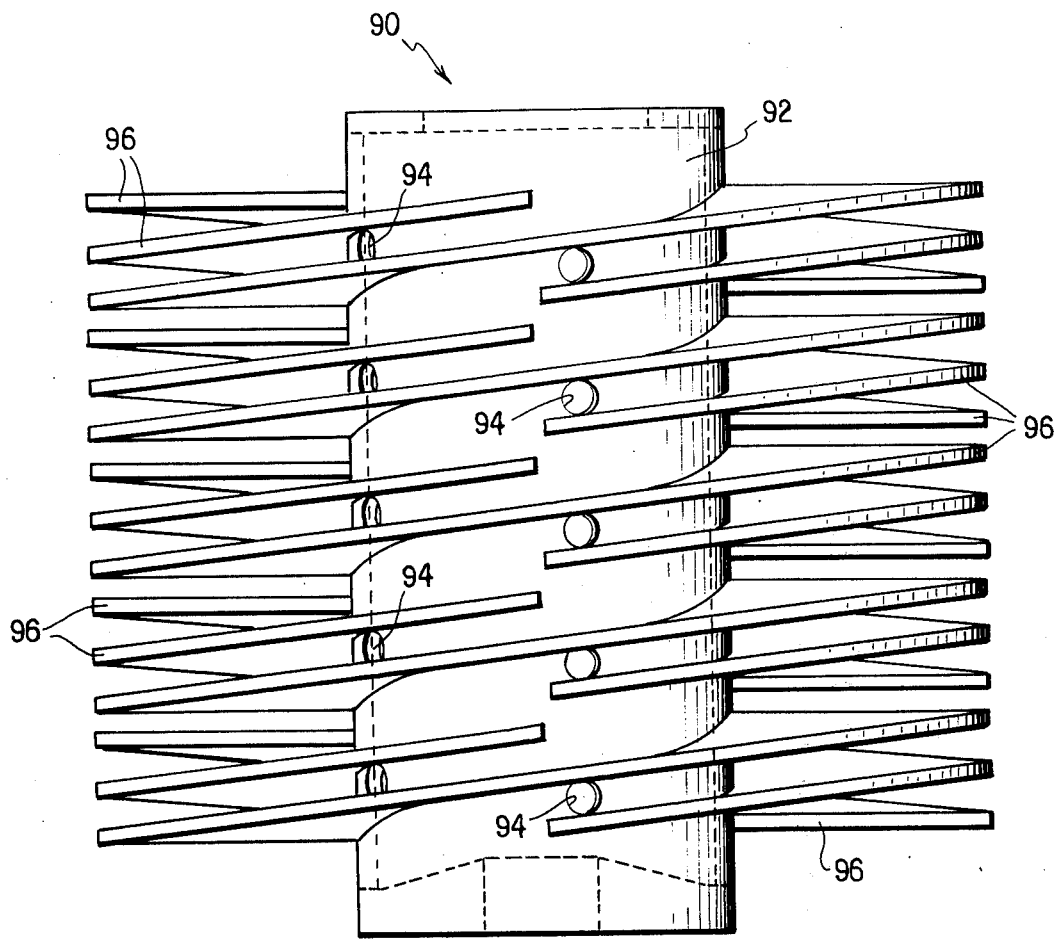

FIG. 10 illustrates a preferred form of dispensing head assembly and which includes the body portion 90 having the cylindrical wall 92 upon which the spiral vane segments are affixed. As before, each vane extends over 180° of arc of the surface 92 and they are circumferentially and axially staggered as shown. As before, the interior of the body portion 90 is hollow and is provided with the discharge orifices 94 at four orthogonally located circumferential positions around the circumference of the cylindrical surface 92. The vanes 96 are pitched at a shallow angle and a large plurality of them are disposed axially along the body portion 90 in the manner shown.

Figure 11:
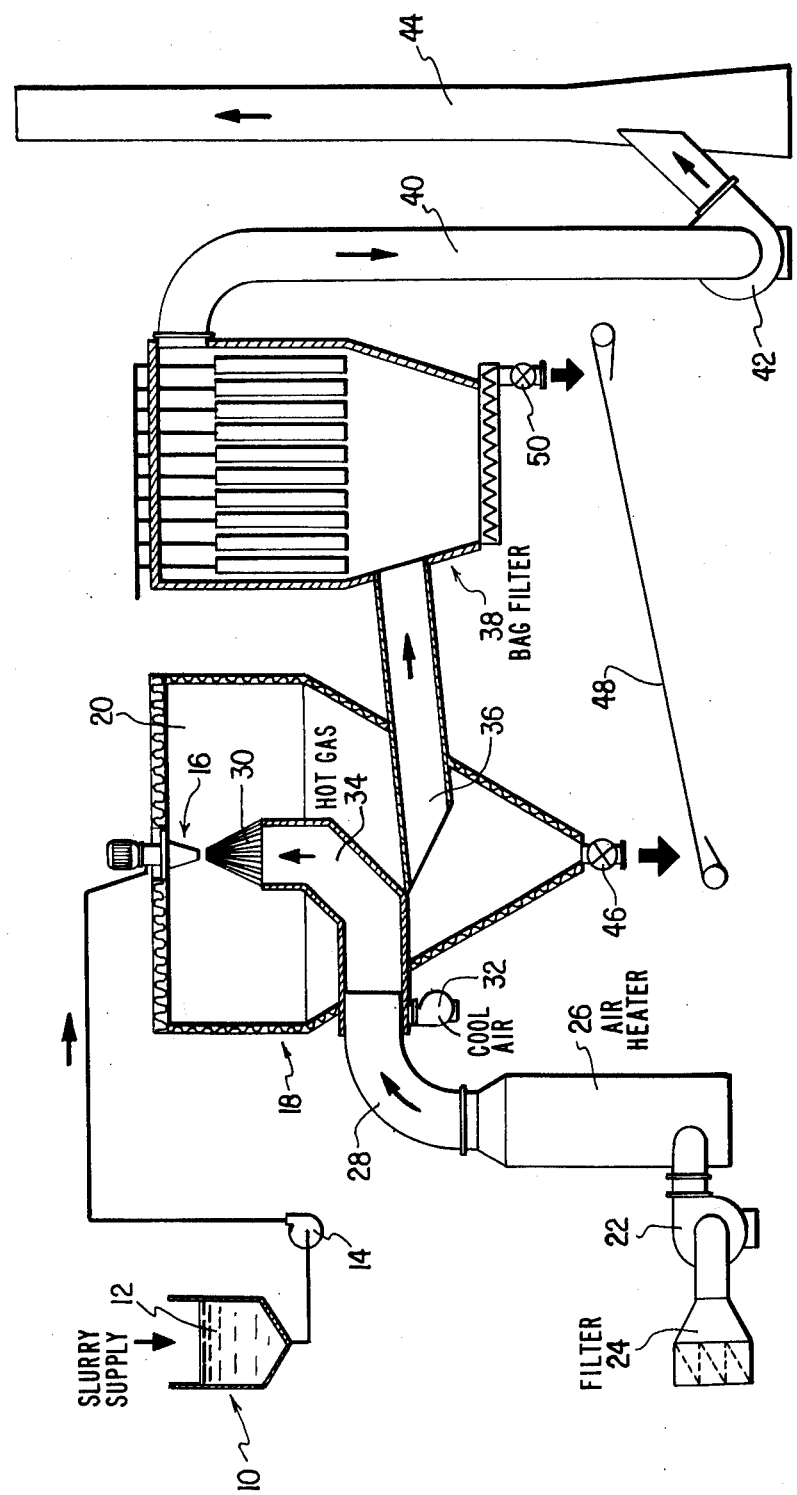

In all forms of the invention, an essential feature is the fact that the hottest air entering the chamber 20 immediately impinges upon and is acted upon by the dispensing head, the heated gas flow channels created by the spiral vanes forcing the air or other heated gas forcibly to scrub the spreading liquid slurry traversing the vane surfaces to assure favorable viscosity of the slurry and to effect initial drying action. The net result is an efficient use of the heated gas and superior drying efficiency, resulting in less fines being educted from the chamber 20 with the heated gas discharge, thereby decreasing the load on the separator assembly 38 of FIG. 11.

What is claimed is:

1. An apparatus for spray drying a slurry or the like comprising a drying chamber, a high speed rotary atomizing head within the drying chamber including a hollow body portion and external rotary driving means coupled with the body portion to rotate the same at high speed in the drying chamber, said hollow body portion having circumferentially spaced slurry discharge orifices extending radially of the rotational axis of the body portion, slurry delivery means connected with the hollow body portion for feeding a slurry thereto from a slurry source external to the drying chamber, a plurality of radially wide and axially spaced parallel spiral vanes on the exterior of the body portion of the atomizing head, each vane comprising an interrupted spiral segment extending for a part only of the circumference of said body portion and rigid therewith and being staggered on the body portion axially relative to adjacent segments to thereby define plural drying gas inlet mouths peripherally and axially distributed around the circumference of the rotary atomizing head, and said mouths each being adjacent to one of said slurry discharge orifices and each directing the gas transversely across the associated orifice axis, and conduit means connected in said drying chamber for introducing a heated drying gas into the chamber in proximity to the rotary atomizing head and for causing cyclonic flow of the gas in the drying chamber, the drying gas entering said mouths between said vane segments and passing radially and circumferentially over the faces of the vane segments to scrub and dry slurry films as the films move radially outwardly on the vane segments, atomized slurry particles which are formed radially from the atomizing head being further dried in said chamber by passing into the cyclonic flow stream of said gas, dry solids outlet means on the drying chamber, and spent drying gas exhaust means in the drying chamber.

2. An apparatus for spray drying a slurry as defined in claim 1, and the circumferential edges of said vane segments being serrated to further disintegrate slurry droplets which are flung by centrifugal force from the atomizing head.

3. An apparatus for spray drying a slurry as defined in claim 1, and said circumferentially spaced slurry discharge orifices of the hollow body portion being arranged in discrete rows axially of the body portion whereby each drying gas inlet mouth receives the drying gas substantially at a point where slurry from the interior of said body portion is being discharged radially through one of said slurry discharge orifices.

4. An apparatus for spray drying a slurry as defined in claim 1, and said slurry delivery means including a relatively stationary delivery cone having a mouth projecting into an opening formed in one end wall of the rotating body portion.

5. An apparatus for spray drying a slurry as defined in claim 4, and an axial rotational drive shaft for the atomizing head extending through said cone and cone mouth and being coupled centrally to the remote end wall of said body portion, said drive shaft projecting exteriorly of said drying chamber to a power drive means.

6. An apparatus for spray drying a slurry as defined in claim 5, and at least one internal radially extending slurry accelerator plate fixed to the side wall of the hollow body portion and extending between the opposite end walls thereof.

7. An apparatus for spray drying a slurry as defined in claim 5, and a plurality of internal radial circumferentially spaced slurry accelerator plates fixed on the side wall of the hollow body portion with one accelerator plate near and rearward of each said slurry discharge orifice with respect to direction of rotation.

* * * * *